United States Patent [19]

Larsen et al.

[11] 4,384,109

[45] May 17, 1983

[54] UNSATURATED POLYESTERS PREPARED FROM A DICARBOXYLIC ACID AND DIBROMONEOPENTYL GLYCOL

[75] Inventors: Eric R. Larsen; Ernest L. Ecker, both of Midland, Mich.

[73] Assignee: The Dow Chemical Company, Midland, Mich.

[21] Appl. No.: 189,236

[22] Filed: Sep. 22, 1980

Related U.S. Application Data

[63] Continuation-in-part of Ser. No. 99,259, Dec. 3, 1979, abandoned.

[51] Int. Cl.$^3$ .................. C08G 63/30; C08G 63/38
[52] U.S. Cl. .................................... 528/274; 528/275; 528/306
[58] Field of Search .............. 528/274, 275, 299, 303, 528/306; 524/724, 751, 777, 186, 107, 114, 199, 203

[56] References Cited

U.S. PATENT DOCUMENTS

| | | | |
|---|---|---|---|
| 1,860,164 | 5/1932 | Alsem | 528/274 |
| 2,646,416 | 7/1953 | Parker | 528/274 |
| 3,640,964 | 2/1972 | Stewart et al. | 528/299 |
| 3,891,605 | 6/1975 | Larsen et al. | 528/299 |
| 4,003,961 | 1/1977 | Stevens et al. | 528/274 |
| 4,067,856 | 1/1978 | Muntz et al. | 528/274 |
| 4,175,072 | 11/1979 | Parr et al. | 528/299 |
| 4,184,035 | 6/1980 | Goins | 528/274 |
| 4,264,745 | 4/1981 | Foucht | 528/299 |

*Primary Examiner*—Allan Lieberman

[57] ABSTRACT

Unsaturated esters can be prepared from dicarboxylic acids and dibromoneopentyl glycol with improved resin color in a shorter reaction time with minimal corrosion of metallic reaction vessels and with a net energy saving by the process using an aryl sulfonic acid as the esterification catalyst and following completion of the reaction neutralizing the acid catalyst.

11 Claims, No Drawings

UNSATURATED POLYESTERS PREPARED FROM A DICARBOXYLIC ACID AND DIBROMONEOPENTYL GLYCOL

CROSS-REFERENCE TO COPENDING APPLICATION

This application is a continuation-in-part of our copending application, U.S. Ser. No. 099,259, filed Dec. 3, 1979, now abandoned.

BACKGROUND OF THE INVENTION

Unsaturated polyester resins are conventionally prepared by reacting dibasic acids; i.e., phthalic anhydride, maleic anhydride, etc., and difunctional alcohols; i.e., ethylene glycol, propylene glycol, etc., in stainless steel reactors at temperatures between 170°–200° C. Corrosion of stainless steel is slow enough in these systems that it does not have an adverse effect on either reactor life or resin color.

Synthesis of unsaturated polyester resins such as those described in U.S. Pat. No. 3,507,933, i.e., fire retardant resins prepared from phthalic anhydride, maleic anhydride, and dibromoneopentyl glycol, results in corrosion problems when carried out in stainless steel reactors, and this in turn leads to color problems.

The use of sulfuric acid and sulfonic acids as catalysts for polyesterification reactions using saturated dibasic acids are known in the prior art, e.g., P. J. Flory disclosed the use of p-toluene sulfonic acid (p-TSA) as a catalyst for the reaction of adipic acid and ethylene glycol in 1939. Later attempts to use strong acid catalysts in the preparation of unsaturated polyester resins have been less than successful. Weakly acidic or basic catalysts are usually required for reactions involving aliphatic diols in order to prevent dehydration to ether or olefin. It has also been pointed out that acid catalysts such as sulfuric acid or p-TSA, while increasing the rate of both esterification and isomerization, usually cause color formation and other detrimental side reactions.

Some of these adverse reactions caused by the presence of sulfuric, or sulfonic acids, include premature gelation of the styrenated and unstyrenated resins and the loss of glycol from the cook due to the formation of volatile ethers. It has been shown that as little as 50 ppm of sulfuric acid will catalyze the formation of ethers from aliphatic diols at polyester reaction temperatures.

SUMMARY OF THE INVENTION

Unsaturated polyesters containing dibromoneopentyl glycol for at least a part of the polyol are prepared with less color, in shorter reaction times and at lower temperatures by the process wherein an aryl sulfonic acid is used as the catalyst and that catalyst is neutralized following esterification by the addition of an acid scavenger to the reaction mixture.

DETAILS OF THE INVENTION

An unsaturated polyester is a condensation polymer produced by condensing approximately equimolar proportions of at least one dicarboxylic acid, at least a portion of which contains ethylenic unsaturation, with at least one polyol, which for purposes of this invention, must be made up at least in part of dibromoneopentyl glycol. Examples of such unsaturated acids include maleic, fumaric, itaconic and others. The remainder, if any, of the dicarboxylic acids are usually either saturated normal aliphatics, such as adipic acid, succinic acid, tetrahydrophthalic acid and the like or aromatic diacids, such as phthalic acid, isophthalic acid or the like. The term dicarboxylic acid, as used herein, is intended to embrace the anhydride as well.

The unsaturated acid provides the unsaturation needed for curing the resin. Therefore, the actual ratio of unsaturated acid to saturated acid will be dictated by the degree of crosslinking desired in the cured product. That degree of crosslinking may be predetermined by simple preliminary experiments as is standard in the polyester art.

The polyol to be used is dibromoneopentyl glycol. Other nonhalogenated glycols may be used in small amounts without affecting the inventive concept. However, when using aryl sulfonic acids as the esterification catalysts, those nonhalogenated glycols form ethers and other undesirable by-products. The present invention appears to be singularly well adapted for use with dibromoneopentyl glycol which must form the substantial majority of the polyol.

The acid scavenger to be used in the process is any compound that will neutralize the acid catalyst through formation of a salt, ester, amine salt or by other means. Typical of such scavengers are the oxirane compounds, such as epichlorohydrin, the diglycidyl ether of a polyol as, for example, the diglycidyl ether of an aliphatic glycol sold commercially as DER-736 and other epoxy compounds; oxetane compounds such as bis-2,2-(dibromomethyl)oxetane; amines such as diethanolamine or triethanolamine; soluble salts of weak acids such as sodium acetate.

The esterification catalyst is an aryl sulfonic acid or an ester of such an acid. Typical of those acids are benzene sulfonic acid and p-toluene sulfonic acid. The amount of catalyst can vary between about 0.05 and 3 percent by weight of the reactants. Preferaby, the amount is between 0.1 and 0.4 weight percent.

The polyester is made in generally conventional manner except as otherwise described herein. In one embodiment, the acid, dibromoneopentyl glycol and catalyst are introduced into a suitable esterification reaction vessel equipped with means for removing water of esterification suitably as it is formed in the reaction. The reactants are blanketed with an inert atmosphere, preferably nitrogen gas, then agitated and heated to effect the reaction for a desired period of time. The reaction temperature can range from about 100° to 200° C., preferably from 135° to 165° C. The exact reaction time will depend on the resin formulation, the amount of catalyst, the reaction temperature and pressure and the inert gas sparge rate.

The degree of reaction is conveniently determined by measuring the acid number or by measuring the amount of water liberated in the reaction. The reaction is discontinued when the product has a desired acid number, e.g., an acid number of 40 or below. After the reaction has been carried to the desired degree of completion, the acid scavenger is added.

In another embodiment, the dibromoneopentyl glycol is melted and the aryl sulfonic acid catalyst dissolved therein. While still molten, the acid scavenger may be added to neutralize the mixture by converting the acid to the corresponding ester. Such dissolved or dispersed esters are useful in causing esterification of the glycol and acid or anhydride. During the cook, the catalyst acid scavenger ester splits to form the acid which acts as a catalyst. Prior to styrenation of the resin solids, the resin is treated with a scavenger to remove strong noncarboxylic acids.

Alternatively, the aryl sulfonic acid and glycol can be mixed to form a physical blend which is useful as a premix for preparing glycol-carboxylic acid esters.

The resin is then recovered and blended with an ethylenically unsaturated monomer copolymerizable with the unsaturated polyester polymers to form a blend wherein the weight ratio of polyester to monomer is in the range from about 4:1 to about 1:2. Such ethylenically unsaturated monomers are well known and include styrene, chlorostyrene, vinyl toluene, divinylbenzene, dicyclopentadiene alkenoate, acrylic and methacrylic acid, diallyl phthalate and like unsaturated monomers or mixtures thereof.

These polyester blends with unsaturated monomers should contain about 20 to about 60 percent by weight and preferably 30–50 percent by weight of the monomers based on the weight of the polyester. A small amount of an inhibitor such as tertiary butyl catechol, hydroquinone, or the like, may be added to this mixture.

The final blend is a crosslinkable polyester composition which is useful to make laminates, castings or coatings.

Laminates can be made by mixing into the crosslinkable composition, free radical forming catalysts in known amounts and adding this mixture to a suitable fibrous reinforcement such as carbon fibers, fibrous glass or inorganic fibers.

Examples of these catalysts are benzoyl peroxide, tertiary butyl peroxide, methylethyl ketone peroxide and the like. It is frequently of value to add accelerators such as cobalt naphthenate, dimethyl aniline and the like.

The polyester resin is rolled, sprayed or impregnated into the fibrous reinforcement such as fibrous glass or is used in filled compositions and cured in a manner well known in the art. When fibrous glass is used, it can be in any form such as chopped strands, filaments, glass ribbons, glass yarns or reinforcing mats. Typical fillers include calcium carbonate and aluminum trihydrate.

The following examples are presented to illustrate but not limit the invention.

EXAMPLE 1

The laboratory cooks were carried out in a 2 liter resin flask, equipped with a mechanical stirrer, a stainless steel $N_2$ sparge tube, a stainless steel thermowell, and a steam heated (100° C.) partial condenser followed by a Dean-Stark tube followed by a water cooled condenser. The reaction heat source was two 275 watt infrared lamps and the whole resin flask was kept in a hot air oven.

The resin flask was charged with 800 grams (3.05 moles) of commercial dibromoneopentyl glycol, 170 grams (1.73 moles) of maleic anhydride, 110 grams (0.74 mole) of phthalic anhydride and 80 grams (4.44 moles) of water.

The reactor was sparged with $N_2$ (1190 cc/min) to remove air from the system prior to the start of the reaction and to aid in the removal of water after the reaction was started. [For comparative purposes, the cook time is considered to be that part of the cycle from the time the reaction temperature reached 125° C. until the reaction was terminated.]

The temperature controller was set at 135° C. and the reaction started. The reaction reached 125° C. in about 45 minutes and 135° C. in 55 minutes. The reaction temperature was maintained at 135° C. until the acid number reached 29. (The usual acid number for making polyesters is 30±2). The cook time was 22 hours.

The crude alkyd was poured into a polytetrafluoroethylene coated pan and allowed to cool.

Samples were made up for testing by dissolving 75 grams of alkyd in 25 grams of styrene, containing 0.02 gram of toluhydroquinone. The styrenated resin had the following properties:

| | |
|---|---|
| Gardner Color | 8.7 |
| SPI Gell Time | 5.1 min. |
| SPI Peak Time | 6.9 min. |
| SPI Peak Exotherm | 188° C. |

To a sample of this styrenated resin was added 1 weight percent epichlorohydrin to bleach the color caused by dissolved iron bromide. The bleached sample had the following properties:

| | |
|---|---|
| Gardner Color | 3.9 |
| SPI Gell Time | 6.1 min. |
| SPI Peak Time | 8.1 min. |
| SPI Peak Exotherm | 213° C. |

EXAMPLE 2

The above procedure was repeated except that 2.1 grams (0.011 mole) of p-TSA was added to the reactor along with the charge. The reaction required 5.0 hours to reach an acid number of 30. Samples of styrenated resin were made up as in Example 1 and the following results were obtained:

| | Without Epichlorohydrin | With Epichlorohydrin |
|---|---|---|
| Gardner Color | 2.4 | 2.4 |
| SPI Gel Time | 1.6 min. | 6.6 min. |
| SPI Cure Time | 2.7 min. | 8.8 min. |
| SPI Peak Exotherm | 133° C. | 209° C. |

EXAMPLE 3 p-Toluene sulfonic acid (TSA), 3.6 grams, was added to 1200 grams of molten (110° C.) dibromoneopentyl glycol prepared as described in U.S. Pat. No. 3,932,541 prior to neutralization with an oxirane. To the molten solution was added 23 grams of a commercial polyglycol diepoxide having an epoxide equivalent weight of 175–205 and sold commercially as D.E.R.® 736, to neutralize the solution and to convert any residual hydrogen bromide or TSA to their corresponding esters. The molten mixture was then allowed to solidify and crushed.

The DBNPG-TSA mixture was converted to an unsaturated polyester resin according to the procedure of Example 1, except as noted below.

A mixture of maleic (192 grams, 1.96 moles) and phthalic anhydride (295 grams, 1.99 moles) were premelted and heated to 140° C. The solid DBNPG-TSA (1048 grams, 4.0 moles) was added to the molten anhydrides as rapidly as possible. During the addition, the reactor temperature fell to ~75° C. The mixture was then heated rapidly to 160° C. and maintained there until the acid number reached approximately 37. The reaction time, as measured from the time the reaction temperature reached 160° C., was 7 hours.

The crude alkyd was poured into a pan coated with Teflon ® and allowed to cool.

Samples were made up for testing by dissolving 75 grams of alkyd in 25 grams of styrene, containing 0.02 gram of toluhydroquinone. The styrenated resin (25 percent styrene) had the following properties:

|  | Without Epichlorohydrin | With Epichlorohydrin (1%) |
| --- | --- | --- |
| Gardner Color | >4 | 4 |
| Gardner Viscosity | >Z-6 | Z-5½ |
| SPI Gel Time (min) | 2.2 | 4.1 |
| SPI Cure Time (min) | 3.3 | 5.6 |
| SPI Peak Exotherm (°C.) | 176 | 213 |

EXAMPLE 4

In a similar experiment, a mechanical mixture of 1048 grams (4.0 moles) of DBNPG and 3.15 grams of TSA was added to a molten mixture of 192 grams (1.96 moles) of maleic anhydride and 295 grams (1.99 moles) of phthalic anhydride.

Reaction time, measured from 160° C., was 7 hours and the alkyd had an acid number of 34.2.

Samples of the resin prepared as in Example 3 had the following properties:

|  | Without Epichlorohydrin | With Epichlorohydrin (1%) |
| --- | --- | --- |
| Gardner Color | 4.5 | 4 |
| Gardner Viscosity | Z-5½ | Z-4½ |
| SPI Gel Time (min) | 3.4 | 5.1 |
| SPI Cure Time (min) | 4.7 | 6.9 |
| SPI Peak Exotherm (°C.) | 182 | 211 |

What is claimed is:

1. In the process for preparing unsaturated polyesters by reacting at an elevated temperature not greater than 200° C., an unsaturated dicarboxylic acid with a polyol, the substantial majority of which is dibromoneopentyl glycol, the improvement wherein the catalyst employed is an aryl sulfonic acid comprising about 0.05 to 3 percent by weight of the reactants and there is also present a sufficient amount of an acid scavenger to neutralize said sulfonic acid.

2. The process of claim 1 wherein said acid scavenger is an oxirane compound.

3. The process of claim 2 wherein said oxirane compound is a glycidyl ether.

4. The process of claim 3 wherein said glycidyl ether is a diglycidyl ether of a polyol.

5. The process of claim 2 wherein said oxirane compound is epichlorohydrin.

6. The process of claim 1 wherein the reaction is carried out at a temperature of from 100° to 200° C.

7. The process of claim 1 wherein said aryl sulfonic acid is p-toluene sulfonic acid.

8. The process of claim 1 wherein said acid scavenger is an amine.

9. The process of claim 8 wherein said amine is diethanolamine.

10. The process of claim 1 wherein the reaction mixture contains a small amount of water or alkylene glycol.

11. In the process for preparing unsaturated polyesters by reacting at an elevated temperature not greater than 200° C., an unsaturated dicarboxylic acid with a polyol, the substantial majority of which is dibromoneopentyl glycol, the improvement wherein the catalyst employed is an aryl sulfonic acid comprising about 0.05 to 3 percent by weight of the reactants and following completion of the reaction, there is added a sufficient amount of an acid scavenger to neutralize said sulfonic acid.

* * * * *